US008854689B2

(12) United States Patent  (10) Patent No.: US 8,854,689 B2
Faber et al.  (45) Date of Patent: *Oct. 7, 2014

(54) SYSTEM, METHOD AND SOFTWARE FOR REDUCING PRINTER COLORANT USAGE

(71) Applicant: International Paper Company, Memphis, TN (US)

(72) Inventors: Richard D. Faber, Memphis, TN (US); Krishna Pamidimukkala, Paramus, NJ (US); Donna Wenzel, Cordova, TN (US); Maria Andrea Dannemiller, Liberty Township, OH (US)

(73) Assignee: International Paper Company, Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/904,111

(22) Filed: May 29, 2013

(65) Prior Publication Data

US 2013/0265599 A1  Oct. 10, 2013

Related U.S. Application Data

(63) Continuation of application No. 12/837,957, filed on Jul. 16, 2010, now Pat. No. 8,456,705.

(60) Provisional application No. 61/232,193, filed on Aug. 7, 2009.

(51) Int. Cl.
*G06F 15/00* (2006.01)

(52) U.S. Cl.
USPC ............ 358/1.9; 358/1.14; 358/1.15; 347/14

(58) Field of Classification Search
None
See application file for complete search history.

(56) References Cited

U.S. PATENT DOCUMENTS

| 4,040,900 A | 8/1977 | Mazzarella et al. |
| 4,279,794 A | 7/1981 | Dumas |
| 5,442,541 A | 8/1995 | Hube et al. |
| 5,649,071 A | 7/1997 | Klassen et al. |
| 5,801,722 A | 9/1998 | Ueda et al. |
| 5,846,863 A | 12/1998 | Lee et al. |
| 5,995,976 A | 11/1999 | Walker et al. |
| 6,134,659 A | 10/2000 | Sprong et al. |
| 6,233,061 B1 | 5/2001 | Huang et al. |
| 6,313,925 B1 | 11/2001 | Decker et al. |

(Continued)

FOREIGN PATENT DOCUMENTS

| EP | 629741 | 12/1994 |
| EP | 666368 | 8/1995 |

(Continued)

OTHER PUBLICATIONS

E. Strazdins, The Sizing of Paper, second edition, by W. F. Reynolds, TAPPI Press, 1989, pp. 1-31.

(Continued)

*Primary Examiner* — Mark Zimmerman
*Assistant Examiner* — Helen Q Zong
(74) *Attorney, Agent, or Firm* — Thomas W. Barnes, III (57) ABSTRACT

A system, method, and printer controller software for reducing printer colorant usage by using printer controller software which controls the deposition by the printer of the printer colorant on the printable medium in response to selected print image quality and printer colorant reduction criteria, as well as identifying printer colorant deposition characteristics of the printable medium, identifying characteristics of the printer, and identifying characteristics of the printer colorant.

58 Claims, 5 Drawing Sheets

(56) References Cited

U.S. PATENT DOCUMENTS

| | | |
|---|---|---|
| 6,764,726 B1 | 7/2004 | Yang et al. |
| 6,863,374 B2 | 3/2005 | Yamazaki et al. |
| 7,545,522 B1 | 6/2009 | Lou |
| 8,012,551 B2 | 9/2011 | Song et al. |
| 2002/0049037 A1 | 4/2002 | Christensen et al. |
| 2002/0138754 A1 | 9/2002 | Himeno |
| 2003/0004889 A1 | 1/2003 | Fiala et al. |
| 2003/0016980 A1 | 1/2003 | Meunier et al. |
| 2003/0072022 A1 | 4/2003 | Someno |
| 2004/0051891 A1 | 3/2004 | Moro et al. |
| 2004/0181456 A1 | 9/2004 | Matsumori |
| 2004/0223172 A1 | 11/2004 | Yoshizawa et al. |
| 2005/0044359 A1 | 2/2005 | Eriksson et al. |
| 2005/0063749 A1 | 3/2005 | Harris et al. |
| 2005/0111047 A1 | 5/2005 | Rhoads |
| 2006/0060317 A1 | 3/2006 | Roding et al. |
| 2006/0200420 A1 | 9/2006 | Osada |
| 2007/0055884 A1 | 3/2007 | Rhoads |
| 2007/0087138 A1 | 4/2007 | Koenig et al. |
| 2007/0143228 A1 | 6/2007 | Jorden et al. |
| 2007/0171245 A1 | 7/2007 | Ueda et al. |
| 2007/0206217 A1 | 9/2007 | Maruyama |
| 2008/0079962 A1 | 4/2008 | Torikoshi |
| 2008/0175641 A1 | 7/2008 | Harris et al. |
| 2008/0180494 A1 | 7/2008 | Studer |
| 2008/0309959 A1 | 12/2008 | Martinez et al. |
| 2009/0128838 A1 | 5/2009 | Yamamoto |
| 2009/0153613 A1 | 6/2009 | Yamanobe |
| 2009/0167796 A1 | 7/2009 | Ueda |
| 2009/0171747 A1 | 7/2009 | Lanning et al. |
| 2009/0244589 A1 | 10/2009 | Ishimoto |
| 2009/0257080 A1 | 10/2009 | Herrmann et al. |
| 2009/0257102 A1 | 10/2009 | Silverbrook |
| 2012/0127509 A1 | 5/2012 | Faber |

FOREIGN PATENT DOCUMENTS

| | | |
|---|---|---|
| EP | 821320 | 1/1998 |
| EP | 915414 | 5/1999 |
| EP | 1191434 | 3/2002 |
| GB | 786543 | 11/1957 |
| GB | 903416 | 8/1962 |
| GB | 1373788 | 11/1974 |
| GB | 1533434 | 11/1978 |
| GB | 2334124 | 8/1999 |
| WO | 9915955 | 4/1999 |

OTHER PUBLICATIONS

G.A. Smook, Handbook for Pulp and Paper Technologists (2nd Edition, 1992), pp. 273-278.

Hong-Kee et al., Third Order Polynomial Black Printer Algorithm with Ink Jet Printer, Comput. Software Technol. Lab., Virtual Reality Res. Centre, TENCON 99. Proceedings of the IEEE Region 10 Conference vol. 1, Sep. 15-17, 1999, p. 451-454, vol. 1, Taejon, South Korea.

C.E.Farley R.B. Wasser, The Sizing of Paper, second edition, by W. F. Reynolds, Tappi Press, 1989, pp. 51-62.

Avery Wizard for Microsoft Office, www.avery.com, Aug. 20, 2010, retreived from the Internet Archive Wayback Machine, 3 pages.

How to Print a Word document in draft mode using Windows 7, answers.microsoft.com, Apr. 21, 2010.

Avery Easy Peel White Address Labels for Laser Printers, www.avery.com, Aug. 27, 2010, retreived from the Internet Archive Wayback Machine, 2 pages.

SYSTEM, METHOD AND SOFTWARE FOR REDUCING PRINTER COLORANT USAGE

FIELD OF THE INVENTION

The present invention broadly relates to a printer controller for a system comprising a printer, computer and display device for controlling deposition by the printer of printer colorant on a printable medium having identifying printer colorant deposition characteristics data to thereby reduce printer colorant usage. The present invention also broadly relates to a method for reducing printer colorant usage by selecting print image quality and printer colorant reduction criteria, determining identifying characteristics of the printer, printer colorant, and printable medium, and controlling deposition by the printer of the printer colorant on the printable medium in response to these criteria and characteristics. The present invention further broadly relates to a machine readable medium having associated therewith printer controller software which is loadable on a computer for controlling the deposition of the printer colorant on the printable medium to thereby reduce printer colorant usage in response to these criteria and characteristics.

BACKGROUND

In recent years, digital cameras and personal computers have become widespread. Data generated by the digital cameras or the personal computers may be printed by ink jet printers or laser printers. These printers adhere ink or toner onto a printable medium, such as paper. The ink or toner may be stored, for example, in a cartridge. The cartridge may then be replaced when the ink or the toner is consumed.

In the case of significant ink or toner consumption, as the frequency of replacement of the cartridge is increased, the cost for purchasing the cartridge becomes higher. In fact, a significant cost associated with owning a printer is that of replacing used printer cartridges. While the price of printers is currently decreasing, the price of printer cartridges generally does not. Thus a user may be persuaded to buy a printer because it is less expensive, but is then committed to frequent purchases of more expensive printer cartridges.

One way to reduce the costs associated with buying replacement printer cartridges is to use less ink/toner so that each printer cartridge lasts longer, and needs to be replaced less frequently. The software print drivers which are provided with printers and installed on the controlling computer may offer a user the option of printing in, for example, "draft," "economy," or "high quality" mode, where "draft" and "economy" modes use less ink/toner than "high quality" mode. However, "draft" mode may provide such poor print quality that documents printed using this mode may not be usable for anything except for quick checks of content and proofing. "Economy" mode may yield better image output than "draft" mode, but may not provide the quality required for most documents intended for distribution to the intended audience. In fact, use of "draft" or "economy" modes may lead to even greater usage of ink/toner as the same document is printed several times, for example, once in a lower quality mode and then again in a higher quality mode.

There have been proposed methods for calibrating the image data to be printed to reduce ink or toner consumption without deteriorating the quality of the image printed. For example, according to a method disclosed in U.S. Pat. Appln. No. 2005/0063749 (Harris et al.), published Mar. 24, 2005, image data may be calibrated according to an ink reduction amount set by a user and then transmitted to a printer driver, thereby reducing ink consumption by the printer. However, even with the same ink reduction amount, the degree with which quality of the printed image may deteriorate as a result of such calibration may vary depending on the type of image to be printed based on the image data (e.g., photographs taken by digital cameras or documents) or the type of paper being printed on (e.g., glossy paper or plain paper). For example, when a larger ink reduction amount is set for image data for photographic images, the resultant image quality may deteriorate more than expected. This may necessitate a user to reprint the same image at a lower ink reduction level, thus causing larger ink consumption. Conversely, when a smaller ink reduction level is set to improve the image quality for a document, ink consumption may not be reduced effectively.

SUMMARY

According to a first broad aspect of the present invention, there is provided in a system comprising a printer having identifying printer characteristics data, a source of printer colorant associated with the printer and having identifying printer colorant characteristics data, a computer in electronic communication with the printer and which receives the identifying printer characteristics data and the identifying printer colorant characteristics data, a display device in electronic communication with the computer which displays a printer menu which comprises at least: (a) print image quality criteria to be selected; and (b) printer colorant reduction criteria to be selected, a printer controller associated with the computer, wherein the printer controller controls deposition by the printer of the printer colorant from the printer colorant source on a printable medium having identifying printer colorant deposition characteristics data to thereby reduce printer colorant usage in response to:

(1) the identifying printer characteristics data received by the computer;
(2) the identifying printer colorant characteristics data received by the computer;
(3) the print image quality criteria selected;
(4) the printer colorant reduction criteria selected; and
(5) the identifying printer colorant deposition characteristics data.

According to a second broad aspect of the present invention, there is provided a method for use with a system which comprises a printer, a source of printer colorant associated with the printer, a computer in electronic communication with the printer, and a display device in electronic communication with the computer which displays a printer menu which comprises at least: (a) print image quality criteria to be selected; and (b) printer colorant reduction criteria to be selected, the method comprising the following steps:

(1) selecting print image quality criteria and printer colorant reduction criteria from the printer menu;
(2) determining the identifying printer characteristics of the printer, the identifying printer colorant characteristics, and the identifying printer colorant deposition characteristics of a printable medium on which the printer colorant is to be deposited; and
(3) controlling deposition by the printer of the printer colorant from the printer colorant source on the printable medium to thereby reduce printer colorant usage in response to: (a) the printer image quality and printer colorant reduction criteria selected; and (b) the identifying printer characteristics, the identifying printer colorant characteristics, and the identifying printer colorant deposition characteristics determined.

According to a third broad aspect of the present invention, there is provided a product comprising a machine readable medium having associated therewith printer controller software which is loadable on a computer for controlling a printer having identifying printer characteristics data and which is associated with a source of printer colorant and having identifying printer colorant characteristics data, the computer also being in electronic communication with a display device which displays a printer menu which comprises at least: (a) print image quality criteria to be selected; and (b) printer colorant reduction criteria to be selected, wherein the printer controller software controls deposition by the printer of the printer colorant from the printer colorant source on a printable medium having identifying printer colorant deposition characteristics data to thereby reduce printer colorant usage in response to:

(1) the identifying printer characteristics data;
(2) the identifying printer colorant characteristics data;
(3) the print image quality criteria selected;
(4) the printer colorant reduction criteria selected; and
(5) the identifying printer colorant deposition characteristics data.

BRIEF DESCRIPTION OF THE DRAWINGS

The invention will be described in conjunction with the accompanying drawings, in which.

DETAILED DESCRIPTION

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, directional terms such as "top", "bottom", "side," "front," "frontal," "forward," "rear," "rearward," "back," "trailing," "above", "below", "left", "right", "horizontal", "vertical", "upward", "downward", etc. are merely used for convenience in describing the various embodiments of the present invention. The embodiments of the present invention may be oriented in various ways. For example, the embodiments shown in FIGS. 1 through 5 may be flipped over, rotated by 90° in any direction, etc.

For the purposes of the present invention, the term "printable medium" refers to any material which may be printed on with a printer colorant. Printable mediums may include sheets, webs, strips, films, panes, pages, pieces, etc., which may be continuous in form (e.g., webs) for subsequent sub-dividing into discrete units, or which may be in the form of discrete units (e.g., a sheet)., and which may comprise various materials or combinations of materials, including, for example, plastics (polymers), paper webs, non-wovens, etc.

For the purposes of the present invention, the term "paper web" refers to a fibrous web that may be formed, created, produced, etc., from a mixture, furnish, etc., from paper fibers, plus any other optional papermaking additives such as, for example, fillers, wet-strength agents, optical brightening agents (or fluorescent whitening agent), etc. Paper webs may include an uncoated paper web, coated paper web, etc. The paper web may be in the form of a continuous roll, a discrete sheet, etc.

For the purposes of the present invention, the term "low density coated paper web" refers to a paper web which has 0 or a minimal (e.g., below about 8 gsm, for example below about 6 gsm) paper surface loading of a coating composition present on one or more sides or surfaces of a paper web. In one embodiment of a low density coated paper web, a coating may be present in an amount from about 0.5 to about 4 gsm (e.g., from about 0.75 to about 3 gsm, more typically from about 1 to about 3 gsm) on one or both sides or surfaces of a paper web.

For the purposes of the present invention, the term "uncoated paper web" refers to a paper web which has 0 or substantially 0 paper surface loading of a coating composition present on one or both sides or surfaces of the paper web.

For the purposes of the present invention, the term "single-side coated paper web" refers to a paper web which has a surface loading of a coating composition present on one, but not both, sides or surfaces of the paper web.

For the purposes of the present invention, the term "double-side coated paper web" refers to a paper web which has a surface loading of a coating composition present on both sides or surfaces of the paper web.

For the purposes of the present invention, the term "calendered paper" refers to a paper web which has been subjected to calendering to, for example, smooth out the paper for enabling printing and writing on the paper, and to increase the gloss on the paper surface. For example, calendering may involve a process of using pressure for embossing a smooth surface on the still rough paper surface. Calendering of paper may be carried out on a calendar which may comprise a series of rolls at the end of a papermaking machine (on-line), or separate from the papermaking machine (off-line).

For the purposes of the present invention, the term "paper filler" refers commonly to mineral products (e.g., calcium carbonate, kaolin clay, etc.) which may be used in paper making to reduce materials cost per unit mass of the paper, increase opacity, increase smoothness, etc. These mineral products may be finely divided, for example, the size range of from about 0.5 to about 5 microns.

For the purposes of the present invention, the term "substrate coating composition" refers to those compositions for coating substrates (e.g., paper webs) of a printable medium which may comprise, for example: a substrate pigment component; a metal salt drying agent; a cationic dye fixing agent; and a substrate pigment binder. These substrate coating compositions may also include other optional additives, such as, for example, plastic pigments, optical brightening agents, fluorescent whitening agents, solvents, diluents, anti-scratch and mar resistance agents, etc. These substrate coating compositions may be formulated as an aqueous slurry, a colloidal suspension, a liquid mixture, a thixotropic mixture, etc.

For the purposes of the present invention, the term "solids basis" refers to the weight percentage of each of the respective solid materials (e.g., pigment component; a metal salt drying agent; a cationic dye fixing agent; a pigment binder; plastic pigment, optical brightening agent, etc.) present in the coating composition, coating, etc., in the absence of any liquids (e.g., water). Unless otherwise specified, all percentages given herein for the solid materials are on a solids basis.

For the purposes of the present invention, the term "solids content" refers to the percentage of non-volatile, non-liquid components (by weight) that are present in the composition, etc.

For the purposes of the present invention, the term "substrate pigment" refers to a material (e.g., a finely divided particulate matter) which may be used or may be intended to be used to affect optical properties of the substrate (e.g., paper web) of a printable medium (e.g., paper) and which becomes part of the printable medium prior to use (e.g., printing).

For the purposes of the present invention, the term "calcium carbonate" refers to various calcium carbonates which may be used as substrate pigments, such as precipitated calcium carbonate (PCC), ground calcium carbonate (GCC), modified PCC and/or GCC, etc.

For the purposes of the present invention, the term "precipitated calcium carbonate (PCC)" refers to a calcium carbonate which may be manufactured by a precipitation reaction and which may used as a substrate pigment. PCC may comprise almost entirely of the calcite crystal form of $CaCO_3$. The calcite crystal may have several different macroscopic shapes depending on the conditions of production. Precipitated calcium carbonates may be prepared by the carbonation, with carbon dioxide ($CO_2$) gas, of an aqueous slurry of calcium hydroxide ("milk of lime"). The starting material for obtaining PCC may comprise limestone, but may also be calcined (i.e., heated to drive off $CO_2$), thus producing burnt lime, CaO. Water may added to "slake" the lime, with the resulting "milk of lime," a suspension of $Ca(OH)_2$, being then exposed to bubbles of $CO_2$ gas. Cool temperatures during addition of the $CO_2$ tend to produce rhombohedral (blocky) PCC particles. Warmer temperatures during addition of the $CO_2$ tend to produce scalenohedral (rosette-shaped) PCC particles. In either case, the end the reaction occurs at an optimum pH where the milk of lime has been effectively converted to $CaCO_3$, and before the concentration of $CO_2$ becomes high enough to acidify the suspension and cause some of it to redissolve. In cases where the PCC is not continuously agitated or stored for many days, it may be necessary to add more than a trace of such anionic dispersants as polyphosphates. Wet PCC may have a weak cationic colloidal charge. By contrast, dried PCC may be similar to most ground $CaCO_3$ products in having a negative charge, depending on whether dispersants have been used. The calcium carbonate may be precipitated from an aqueous solution in three different crystal forms: the vaterite form which is thermodynamically unstable, the calcite form which is the most stable and the most abundant in nature, and the aragonite form which is metastable under normal ambient conditions of temperature and pressure, but which may convert to calcite at elevated temperatures. The aragonite form has an orthorhombic shape that crystallizes as long, thin needles that may be either aggregated or unaggregated. The calcite form may exist in several different shapes of which the most commonly found are the rhombohedral shape having crystals that may be either aggregated or unaggregated and the scalenohedral shape having crystals that are generally unaggregated.

For the purposes of the present invention, the term "substrate pigment binder" refers to a binder agent for substrates (e.g., paper webs) of printable mediums which may be used to improve the substrate pigment binding strength of substrate coating composition, coating, etc. Substrate pigment binders may be hydrophilic. Suitable substrate pigment binders may include synthetic or naturally occurring polymers (or a combination of different polymers), for example, a polyvinyl alcohol (PVOH), starch binders, proteinaceous adhesives such as, for example, casein or soy proteins, etc.; polymer latexes such as styrene butadiene rubber latexes, acrylic polymer latexes, polyvinyl acetate latexes, styrene acrylic copolymer latexes, etc., or a combination thereof The substrate pigment binder may also be substantially free of starch binders and/or latexes as binders to improve the dry time of the coated substrate of the printable medium and to improve the processability of the substrate of the printable medium during the coating process.

For the purposes of the present invention, the term "substantially free" refers to a composition, coating, etc., having less than about 0.1% of a particular component by weight of the composition, coating, etc.

For the purposes of the present invention, the term "starch binder" refers to a binder agent for substrate pigments and/or printable mediums (e.g., paper) which comprises starch, a starch derivative, etc., or a combination thereof Suitable starch binders may be derived from a natural starch, e.g., natural starch obtained from a known plant source, for example, wheat, maize, potato, tapioca, etc. The starch binder may be modified (i.e., a modified starch) by one or more chemical treatments known in the paper starch binder art, for example, by oxidation to convert some of —$CH_2OH$ groups to —COOH groups, etc. In some cases the starch binder may have a small proportion of acetyl groups. Alternatively, the starch binder may be chemically treated to render it cationic (i.e., a cationic starch) or amphoteric (i.e., an amphoteric starch), i.e., with both cationic and anionic charges. The starch binder may also be a starch converted to a starch ether, or a hydroxyalkylated starch by replacing some —OH groups with, for example, —$OCH_2CH_2OH$ groups, —$OCH2CH_3$ groups, —$OCH_2CH_2CH_2OH$ groups, etc. A further class of chemically treated starch binders which may be used are known as the starch phosphates. Alternatively, raw starch may be hydrolyzed by means of a dilute acid, an enzyme, etc., to produce a starch binder in the form of a gum of the dextrin type.

For the purposes of the present invention, the term "metal salt drying agent" refers to those metal salts which may improve the dry time of inks printed on printable mediums by, for example, ink jet printing processes. These metal salt drying agents may include but are not limited to salts containing calcium or magnesium (e.g., divalent water-soluble metals salts). The counter ions may include chloride, sulfate, nitrate, hydroxide, silicate, etc. Illustrative metal salt drying agents may include metal salts such as sodium chloride, calcium chloride, calcium nitrate, magnesium chloride, magnesium nitrate, aluminum chloride, sodium sulfate, aluminum chloride, aluminum nitrate, aluminum sulfate, potassium chloride, sodium aluminum sulfate, vanadium chloride, magnesium sulfate, sodium silicates, etc., or combinations thereof.

For the purposes of the present invention, the term "cationic dye fixing agent" refers to those cationic compounds (e.g., nitrogen-containing compounds) or mixtures of such compounds which may aid in fixing, trapping, etc , inks printed by ink jet printing processes, and which may provide other properties, including water fastness. These cationic dye fixing agents may include compounds, oligomers and polymers which contain one or more quaternary ammonium functional groups, and may include cationic water-soluble polymers that are capable of forming a complex with anionic dyes. Such functional groups may vary widely and may include substituted and unsubstituted amines, imines, amides, urethanes, quaternary ammonium groups, dicyandiamides and the like. Illustrative of such compounds are polyamines, polyethyleneimines, polymers or copolymers of diallyldimethyl ammonium chloride (DADMAC), copolymers of vinyl pyrrolidone (VP) with quaternized diethylaminoethylmethacrylate (DEAMEMA), polyamides, cationic polyurethane latexes, cationic polyvinyl alcohols, polyalkylamines dicyandiamid copolymers, amine glycidyl addition polymers, poly[oxyethylene (dimethyliminio) ethylene (dimethyliminio) ethylene] dichlorides, etc., or combinations thereof These cationic dye fixing agents may include low to medium molecular weight cationic polymers and oligomers having a molecular equal to or less than 100,000, for example, equal to or less than about 50,000, e.g., from about 10,000 to about 50,000. Illustrative of such materials are polyalkylamine dicyandiamide copolymers, poly[oxyethylene(dimethyliminio ethylene(dimethyliminioethylene] dichlorides and polyamines having molecular weights within the desired range. Cationic dye fixing agents suitable herein may include low molecular weight cationic polymers such as polyalkylamine dicyandiamid copolymer, poly[oxyethylene(dimethyliminio)ethylene(dimethyliminio)ethylene] dichloride, for example, low molecular weight polyalkylamine dicyandiamid copolymers. See U.S. Pat. No. 6,764,726 (Yang et al.), issued Jul. 20, 2004, the entire disclosure and contents of which is hereby incorporated by reference.

For the purposes of the present invention, the term "brightness" refers to the diffuse reflectivity of paper, for example, at a mean wavelength of light of 457 nm. As used herein, brightness of the paper web may be measured by, for example, in terms of GE Brightness or ISO Brightness.

For the purposes of the present invention, the term "opacity" refers to the ability of a paper to hide things such as print images on subsequent sheets or printed on the back, e.g., to minimize, prevent, etc., show-through, etc. As used herein, opacity of the paper web may be measured by, for example, in terms of TAPPI opacity and show-through. TAPPI opacity may be measured by T425 om-91.

For the purposes of the present invention, the term "show-through" refers to the degree to which printing on one side of a paper sheet may be seen through the other side of the same sheet. Show-through may correlate to opacity of the paper, the degree of ink penetration into the paper, etc. Values for show-through may be determined by the Show-Through Test Methodology, which is attached hereto as an appendix and which is hereby incorporated by reference herein in its entirety.

For the purposes of the present invention, the term "paper smoothness" refers to the extent to which the paper surface deviates from a planar or substantially planar surface, as affected by the depth of the paper, paper width, numbers of departure from that planar surface, etc. As used herein, the paper smoothness of a paper web may be measured by, for example, in terms of Parker Print Smoothness. Parker Print Smoothness may be measured by TAPPI test method T 555 om-99.

For the purposes of the present invention, the term "print quality" refers to those factors, features, characteristics, etc., that may influence, affect, control, etc., the appearance, look, form, etc., of a printed image on the printable medium. As used herein, print quality of, for example, a paper web may be measured by, for example, in terms of one or more of: (1) print density/contrast (e.g., for BW/color/monochrome); (2) color gamut or color richness (e.g., for digital printing such as ink jet printing, laser printing, etc.); (3) dry times); (4) print gloss or print mottle; (5) etc. For example, black optical print density may be measured by TAPPI method 1213 sp-03. Print mottle may be measured based on 2nd cyan values according to the method disclosed in U.S. Published Application No. 20060060317 (Roding, et al.), published Mar. 23, 2006, which is herein incorporated by reference in its entirety.

For the purposes of the present invention, the term "gloss" refers to the ability of a printable medium, such as paper, to reflect some portion of the incident light at the mirror angle. Gloss may be based on a measurement of the quantity of light specularly reflected from the surface of a paper specimen at a set angle, for example, at 75 degrees, such as in the case of 75 degree gloss (and as measured by TAPPI test method T 480 om-92).

For the purposes of the present invention, the term "print gloss" refers to a gloss measurement made on a printed substrate such as paper.

For the purposes of the present invention, the term "digital printing" refers to reproducing, forming, creating, providing, etc., digital images on a printable medium, for example, paper, Digital printing may include laser printing, ink jet printing, etc.

For the purposes of the present invention, the term "laser printing" refers to a digital printing technology, method, device, etc., that may use a laser beam to create, form produce, etc., a latent image on, for example, a photoconductor drum. The light of laser beam may later create charge on the drum which may then pick up toner which carries an opposite charge. This toner may then be transferred to the paper and the resulting print image created, formed, produced, etc., fused to the printable medium through, for example, a fuser.

For the purposes of the present invention, the term "electrophotographic recording process" refers to a process which records images on a printable medium, such as paper, by xerography or electrophotography. In an electrophotographic process, the image is often formed by toner particles which are deposited one surface or side of the printable medium, and are then thermally fixed and/or fused to that one surface or side of the printable medium, for example, by heating. In electrophotographic recording, the printable medium may have two relatively smooth or flat sides or surfaces, or may have one side or surface which is textured, uneven or nonsmooth/nonflat, while the other side or surface is relatively smooth or flat.

For the purposes of the present invention, the term "ink jet printing" refers to a digital printing technology, method, device, etc., that may form images on a printable medium, such as paper, by spraying, jetting, etc., tiny droplets of liquid inks onto the printable medium through the printer nozzles. The size (e.g., smaller size), precise placement, etc., of the ink droplets may be provide higher quality ink jet prints. Ink jet printing may include continuous ink jet printing, drop-on-demand ink jet printing, etc.

For the purposes of the present invention, the term "print density" refers to the optical density which is a measure of the light absorbing property of a print image. It may be expressed as the logarithm of the reciprocal to the base 10 of the reflectance from the print image being measured. For example, the higher the print density, the darker the print image may appear. Higher print densities provide a higher contrast, a sharper image for viewing, etc. An X-Rite 418 reflection Densitometer may be used to measure black optical density.

For the purposes of the present invention, the term "print contrast" refers to the difference in print density between printed and unprinted areas.

For the purposes of the present invention, the term "color gamut" refers to the total collection of possible colors in any color reproduction system and may be defined by a complete subset colors. A higher color gamut value indicates a more vivid color print quality. Color gamut may be obtained by measuring the CIE L*, a*, b* of a series of color blocks, including white (unprinted area), cyan, magenta, yellow, red, green, blue and black. The CIE L* represents the whiteness.

The value of L* may range from zero (representing black) to 100 (representing white or a perfectly reflecting diffuser). The value of a* represents the degree of green/red. A positive a* is red, while a negative a* is green. A positive b* is yellow, while a negative b* is blue. The CIE L*, a* and b* values may be measured by X-Rite 528 using a D65 light source and a 10-degree viewing angle.

For the purposes of the present invention, the term "color richness" refers to a more vivid or vibrant color print with high print density and high color gamut values.

For the purposes of the present invention, the term "print mottle" refers to non-uniformity in the print image which may be due to unevenness in ink lay, non-uniform ink absorption, etc., across the printable medium surface. Print mottle may be measured using a scanner based mottle tester such as the C3PATX03 Formation and Mottle Test with an Agfa Model DUOSCAN scanner. The printable medium (e.g., paper) sample to be tested is first printed on a test ink jet printer. The test pattern must include a block of solid black (100%) image. The color block is a square of about 20-50 mm by 20-50 mm After 20 minutes of waiting time, or when the printed image is fully dried, the printed sample is positioned on the scanner with printed face down. The scanner is set at a resolution of 500 ppi (pixel per inch). A Verity software (Verity IA LLC, 2114 Sunrise Drive, Appleton, Wiss. 54914) may be used to analyze the test data from the scanner. An appropriate dimension for testing based on the color block dimension is set. Two mottle indices may be measured: Micro Mottle Index and Macro Mottle Index. The Micro Mottle Index measures density variations within an area of $0.1\ \text{in}^2$; while the macro mottle index measures the density variations of the averaged density values of each square of $0.1\ \text{in}^2$. The lower the mottle index value, the better the print quality.

For the purposes of the present invention, the term "color-to-color bleed" refers to the spreading of one color ink into another color ink on paper which may reduce the resolution of the colored text and lines on a colored background. For example blue and black bars may be printed over a yellow color background. Green and black bars may be printed over magenta color background, and red and black bars may be printed over cyan color background. The smallest distance in microns between two color bars without bridging (or color intruding more than half way to the neighboring color bar) is recorded as the color-to-color bleed index. In other words, the smaller the value of color-to-color bleed, the better the print quality. Distances which may be tested include 50 microns, 100 microns, 150 microns, 300 microns, etc. In some embodiments of the present invention, the tested distance may reach 150 microns or less before bridging (bleed) occurs, which may be considered a "good" color-to-color bleed property.

For the purposes of the present invention, the term "ink transfer" refers to a test for determining the image dry time of a printable medium, for example, printable paper sheets. "Ink transfer" is defined herein as the amount of optical density transferred after rolling with a roller, and is expressed as a percentage of the optical density transferred to the unprinted portion of the printable medium (e.g., paper sheet) after rolling with a roller. The method involves printing solid colored blocks on paper, waiting for a fixed amount of time, 5 seconds after printing, and then folding in half so that the printed portion contacts an unprinted portion of the paper sheet, and rolling with a 4.5 lb hand roller as for example roller item number HR-100 from Chem Instruments, Inc., Mentor, Ohio, USA. The optical density is read on the transferred ($OD_T$), the non-transferred ($OD_O$) portions of the block, and an un-imaged area ($OD_B$) by a reflectance densitometer (X-Rite, Macbeth, etc.). The percent transferred ("IT%") is defined as $IT\% = [(OD_T - OD_B)/(OD_O - OD_B)] \times 100$.

For the purposes of the present invention, the term "liquid" refers to a non-gaseous fluid composition, compound, material, etc., which may be readily flowable at the temperature of use (e.g., room temperature) with little or no tendency to disperse and with a relatively high compressibility.

For the purposes of the present invention, the term "viscosity," with reference to coating compositions, refers to Brookfield viscosity. The Brookfield viscosity may be measured by a Brookfield viscometer at 150° F., using a #5 spindle at 100 rpm.

For the purposes of the present invention, the term "substrate surface loading" refers to amount of coating present on a given side or surface of the substrate being treated. Substrate surface loading may be defined in terms of grams of substrate coating composition per square meter of paper web (hereinafter referred to as "gsm").

For the purposes of the present invention, the term "room temperature" refers to the commonly accepted meaning of room temperature, i.e., an ambient temperature of 20° to 25° C.

For the purposes of the present invention, the term "coating" refers to one or more layers, coverings, films, skins, etc., formed, created, prepared, etc., from a substrate coating composition which remains predominantly on the surface(s) of the substrate of a printable medium (e.g., paper).

For the purposes of the present invention, the term "remains predominantly on the surface(s) of the printable medium" refers to the substrate coating composition or coating remaining primarily on the surface of the substrate of a printable medium (e.g., paper), and not being absorbed by or into the interior of the web.

For the purpose of the present invention, the term "treating" with reference to the substrate coating composition may include depositing, applying, spraying, coating, daubing, spreading, wiping, dabbing, dipping, etc.

For the purpose of the present invention, the term "Hercules Sizing Test" or "HST" refers to a test of resistance to penetration of, for example, an acidic water solution through paper. The HST may be measured using the procedure of TAPPI Standard Method 530 pm-89. See U.S. Pat. No. 6,764,726 (Yang et al.), issued Jul. 20, 2004, the entire disclosure and contents of which is hereby incorporated by reference. The HST value is measured following the conventions described in TAPPI Standard Method number T-530 pm-89, using 1% formic acid ink and 80% reflectance endpoint.

For the purpose of the present invention, the term "printer" refers to any device which prints an image on a printable medium, such as paper, including laser printers, ink jet printers, electrophotographic recording devices (e.g., copiers), thermal printers, impact printers (e.g., dot-matrix printers), wide format printers, commercial web printers (e.g., web-pressed printers), scanners, fax machines, etc.

For the purpose of the present invention, the term "identifying printer characteristics" refers to those characteristics of the printer which identify, for example, one or more of its type, model, make, printing characteristics, etc.

For the purpose of the present invention, the term "source of printer colorant" may refers to reservoir, container, bottle, cartridge, etc., holding the printer colorant and from which the printer colorant may be dispensed, dispersed, sprayed, printed, etc.

For the purpose of the present invention, the term "printer cartridge" refers to a replaceable component of a printer which contains printer colorant. Printer cartridges may contain one or more printer colorant reservoirs, electronic contacts and electronic chips for communicating with the printer, etc.

For the purpose of the present invention, the term "printer colorant" may refer to either ink (as used by, for example, an ink jet printer, etc.) and toner (as used by, for example, a laser printer, electrographic recording device, etc.). Printer colorants may be black, white, magenta, cyan, yellow, green, red, brown, blue, orange, purple/lavender/violet, gray, etc., or any combination thereof A printer which uses, dispenses, deposits, prints, etc., only a black colorant is often referred to as being a "black" or "black and white" printer, while a printer which uses, dispenses, deposits, prints, etc., more than one color (e.g., black, magenta, cyan, yellow, etc.) is often referred to as a "color printer."

For the purpose of the present invention, the term "ink" refers to printer colorant as used by ink jet printers. Thus the term "ink cartridge" as used herein refers to a replacement ink cartridge for an ink jet printer. The term ink may include dye-based inks and/or pigment-based inks Dye-based inks comprise a dye which may be an organic molecule which is soluble in the ink medium. Dye-based inks may be classified by their usage, such as acid dyes, basic dyes, or direct dyes, or by their chemical structure, such as azo dyes, which are based on the based on an —N=N— azo structure; diazonium dyes, based on diazonium salts; quinone-imine dyes, which are derivates of quinine, etc. Pigment-based dyes comprise a pigment, which is a solid colored particle suspended in the ink medium. The particle may comprise a colored mineral, a precipitated dye, a precipitated dye which is attached to a carrier particle, etc. Inks are often dispensed, deposited, sprayed, etc., on a printable medium in the form of droplets which then dry on the printable medium to form the print image(s).

For the purposes of the present invention, the term "printed dot" refers to an ink droplet which is printed onto a printable substrate by, for example, an ink jet printer, dot-matrix (impact) printer, etc.

For the purpose of the present invention, the term "toner" refers to printer colorant as used by laser printers. Thus the term "toner cartridge" as used herein refers a replacement toner cartridge for a laser printer. Toner is often dispensed, deposited, etc., on the printable medium in the form of particles, with the particles then being fused on the printable medium to form the image.

For the purpose of the present invention, the term "identifying printer colorant characteristics" refers to those characteristics of a printer colorant which identify, for example, one or more its color, type (e.g., ink or toner), type of ink (e.g., dye-based or pigment-based), consistency (e.g., viscosity, fluidity, etc.), how it is deposited (e.g., type of printer), etc.

For the purpose of the present invention, the term "computer" refers to any type of computer system that implements software including an individual computer such as a personal computer, mainframe computer, mini-computer, etc. In addition, computer system refers to any type of network of computers, such as a network of computers in a business, the Internet, personal data assistant (PDA), devices such as a cell phone, a television, a videogame console, a compressed audio or video player such as an MP3 player, a DVD player, a microwave oven, etc. A personal computer is one type of computer system that may include the following components: a case or chassis in a tower shape (desktop) and the following parts: motherboard, CPU, RAM, firmware, internal buses (PIC, PCI-E, USB, HyperTransport, CSI, AGP, VLB), external bus controllers (parallel port, serial port, USB, Firewire, SCSI. PS/2, ISA, EISA, MCA), power supply, case control with cooling fan, storage controllers (CD-ROM, DVD, DVD-ROM, DVD Writer, DVD RAM Drive, Blu-ray, BD-ROM, BD Writer, floppy disk, USB Flash, tape drives, SATA, SAS), video controller, sound card, network controllers (modem, NIC), and peripherals, including mice, keyboards, pointing devices, gaming devices, scanner, webcam, audio devices, printers, monitors, etc.

For the purpose of the present invention, the term "in electronic communication" refers to two or more devices which are able to transmit electronic signals, data, etc., by a wired connection, wireless connection, or a combination of wired and wireless connections.

For the purpose of the present invention, the term "display device" refers to a device (e.g., a monitor) which presents visual images from a computer for viewing. The display device may be incorporated as a component of the computer, or may be a separate device which is in electronic communication with the computer.

For the purpose of the present invention, the term "printer menu" refers to a menu displayed by the display device (e.g., a dialog box, drop down menu, etc.) which provides the user with the ability to make selections, choices, etc., as to the criteria for operating a printer, including print image quality criteria, printer colorant reduction criteria, number of copies, collation, etc.

For the purpose of the present invention, the term "print image quality criteria" refers to any criteria which may be used to determine the quality of the print image.

For the purpose of the present invention, the term "acceptable print image quality" refers to a level of print image quality of the printed image which is considered acceptable by the user visually and/or by an objective test of print quality.

For the purpose of the present invention, the term "printer colorant reduction criteria" refers to any criteria which may be used to determine the degree to which the deposition of printer colorant is reduced to control usage thereof For the purpose of the present invention, the term "reduction in total usage" refers to a reduction in usage of the printer colorant relative to the amount of printer colorant normally used to provide an acceptable print image quality.

For the purpose of the present invention, the term "device controller" refers to any combination of hardware and/or software which interacts with and controls the operation of a device such as, for example, a printer, video adapter, network card, sound card, etc. Device controllers which comprise software may also function as "device drivers" (often referred to simply as "drivers"). Drivers simplify programming by acting as an interface between the hardware device and the applications or operating system using the device. Drivers often communicate with the device through, for example, the computer bus or communications subsystem to which the device hardware is connected.

For the purpose of the present invention, the term "printer controller" refers to any combination of hardware and/or software which interacts with and controls the operation of a printer. Printer controllers which comprise software may also function as "print drivers," i.e., by converting image data to be printed to a form which may be used by the printer to print the image.

For the purpose of the present invention, the term "controls deposition" refers to altering, modifying, maintaining, correcting, regulating, managing, varying, etc., the manner in which the printer colorant is deposited on the printable medium.

For the purpose of the present invention, the term "identifying printer colorant deposition characteristics" refers to those characteristics which identify how the printer colorant is deposited on the printable medium, including one or more of dry time, print density, etc.

For the purpose of the present invention, the term "data" refers to any information, signal, etc., which quantifies, describes, identifies, etc., an attribute, characteristic, property, etc., of a device, machine, equipment, component, parameter, variable, set of variables, etc.

For the purpose of the present invention, the terms "select," "selecting," and "selected" refer to picking, choosing, deciding, etc., a criteria presented by, for example, a printer menu.

For the purpose of the present invention, the terms "determine," "determining," and "determined" refer to deciding, verifying, ascertaining, establishing, concluding, resolving, etc., a characteristic of, for example, a printer, printer colorant, the source (e.g., printer cartridge) containing the printer colorant, printable medium, etc.

For the purpose of the present invention, the term "software" refers to a general term used to describe any form of programmed machine-readable language or instructions (e.g., object code) that, when loaded or otherwise installed, provides operating instructions to a machine capable of reading those instructions, such as a computer or other type of computer program reader. The term software may include applications such as word processors which perform productive tasks for users, system software such as operating systems which interface with hardware to provide the necessary services for application software, device controllers (e.g., printer controllers such as printer drivers) which control the operation of devices such as display devices (e.g., monitors), printers, etc., and middleware which controls and co-ordinates distributed systems. Software may include programs, etc., that are coded by programming languages like C, C++, Java, etc. Software is usually regarded as anything but hardware, meaning the "hard" are the parts that are tangible (able to hold) while the "soft" part is the intangible objects inside the computer. Software is so called to distinguish it from computer hardware, which encompasses the physical interconnections and devices required to store and execute (or run) the software. At the lowest level, software may comprise a machine language specific to an individual processor. A machine language comprises groups of binary values signifying processor instructions which change the state of the computer from its preceding state. Software may be stored or reside on, as well as be loaded or installed from, one or more floppy disks, CD ROM disks, hard disks (internal or external), or any other form of suitable non-volatile electronic storage medium. Software may also be installed by downloading or by any other form of remote transmission.

For the purpose of the present invention, the term "transmission" refers to any type of transmission that may be carried out electronically by wired methods, wireless methods or combinations thereof Illustrative electronic transmissions may be carried out by a variety of remote electronic transmission methods, such as by using Local or Wide Area Network (LAN or WAN)-based, Internet-based, or web-based transmission methods, cable television or wireless telecommunications networks, other suitable remote transmission method, etc.

For the purpose of the present invention, the term "printer controller software" refers to software which controls the operation of the printer, including controlling deposition of the printer colorant on the printable medium, in response to least: (1) the identifying printer characteristics (data) determined/received; (2) the identifying printer colorant characteristics (data) determined/received; (3) the identifying printer colorant deposition characteristics (data) determined/received; (4) the print image quality criteria selected; and (5) the printer colorant reduction criteria selected. The printer controller software may also function as the print driver for the printer.

For the purpose of the present invention, the term "computer hardware" (hereafter referred to as "hardware") refers to digital circuitry and physical devices of a computer system, as opposed to software, which may be stored on a hardware device such as a hard disk. Illustrative examples of hardware may include the motherboard, CPU, RAM, firmware, internal buses (PIC, PCI-E, USB, HyperTransport, CSI, AGP, VLB), external bus controllers (parallel port, serial port, USB, Firewire, SCSI. PS/2, ISA, EISA, MCA), the power supply, case control with cooling fan, storage controllers (CD-ROM, DVD, DVD-ROM, DVD Writer, DVD RAM Drive, Blu-ray, BD-ROM, BD Writer, floppy disks, USB Flash, tape drives, SATA, SAS), video controllers, sound cards, network controllers (modem, NIC), and other peripherals, including mice, keyboards, pointing devices, scanners, audio devices, printers, display devices (e.g., monitors), etc.

For the purpose of the present invention, the term "user" refers to an individual (or group of individuals) who are using embodiments of the present invention. The term user may also refer to a computer which inputs instructions to a computer system.

For the purposes of the present invention, the term "machine-readable medium" refers to any medium or media on which may be read, for example, by a computer, or any other device capable of reading programmed machine-readable language or instructions. Examples of machine-readable media may include floppy disks, Zip™ disks, CD-ROM, CD-R, CD-RW, DVD, DVD-R, memory sticks, flash memory, hard disks (internal or external), optical disks, etc.

For the purposes of the present invention, the term "image" may refer one or more pictures, one or more photos, one or more designs, one or more alphanumeric characters, etc., or any combination thereof, and which may be displayed on a display device (e.g., monitor), or which may be printed on a printable medium.

For the purposes of the present invention, the term "projected image" refers to one or more digital images which are displayed on a display device (e.g., monitor).

For the purposes of the present invention, the term "printed image" refers to one or more images printed on a printable medium.

For the purposes of the present invention, the term "bitmap" (also referred to as a "pixmap") refers to the conventional meaning of a spatial mapping of an array of bits (e.g., pixels) that may be used to store, define, etc., a digital image.

For the purposes of the present invention, the term "pixel" refers to conventional meaning of the smallest item of information in a digital image.

For the purposes of the present invention, the term "Internet" refers to a global system of interconnected computer networks that interchange data by packet switching using the standardized Internet Protocol Suite (TCP/IP). The Internet may carry various information resources and services, such as electronic mail, online chat, file transfer and file sharing, online gaming, and the inter-linked hypertext documents and other resources of the World Wide Web (WWW).

For the purposes of the present invention, the term "local area network (LAN)" refers to a network covering a small geographic area, such as a home, office, building, office site, etc. The defining characteristics of LANs, in contrast to WANs (wide area networks), include their higher data transfer rates, smaller geographic range, lack of a need for leased telecommunication lines, etc.

For the purposes of the present invention, the term "product key" (also referred to as a "CD key") refers to a security code which may be in the form of a bar code, alphanumeric code, etc., which may be used, required, etc., for installing, downloading, etc., software onto a computer, machine-readable medium, etc., either locally or remotely, or for using the software through a Web-based computer application.

For the purposes of the present invention, the term "sensor" refers to a collector and/or producer of information and/or data. A sensor may be a device or a living organism (e.g., a person). For example, a sensor may be a chemical or spectrophotometric analyzer (e.g., mass spectrometer, UV or infrared spectrometer, an ion-sensitive electrode etc.), an individual observing, measuring, etc., a characteristic (e.g., print quality), etc.

Description

Embodiments of the system (printer controller), method and printer controller software of the present invention provide the user of a printer associated with, for example, a computer, the ability to control (e.g., adjust) the printer operation (e.g., by intercepting a data stream or stream of print instructions to and/or from the computer and/or printer, and to process those same instructions) so that the printer (such an ink jet printer or laser printer) uses less ink/toner to print an image than would otherwise occur if the printer operation were not controlled (e.g., adjusted). This reduced usage of ink/toner may be achieved by having the printer controller/printer controller software control deposition by the printer of the printer colorant from a source thereof (e.g., a printer cartridge) on a printable medium to thereby reduce printer colorant usage in response to: (1) the identifying printer characteristics (data) of the printer; (2) the identifying printer colorant characteristics (data) of the printer colorant; (3) the print image quality criteria selected by the user; (4) the printer colorant reduction criteria selected by the user; and (5) the identifying printer colorant deposition characteristics (data) of the printable medium. For example, the printer controller/printer controller software may respond to specific criteria of: (a) the type of printer being used; (b) the type of ink/toner being used; and (c) the type of printable medium being used, wherein the printable medium (e.g., paper) has specific print density characteristics, including print density characteristics for enhancing print density, such as printer colorant fixer (e.g., an ink/toner fixer) such as a water-soluble divalent metal ion, for example, calcium chloride. Put differently, embodiments of the printer controller/printer controller software may recalibrate the ink/toner necessary to achieve acceptable or satisfactory print densities (and thus print images) by using characteristics (a) through (c) above, and controlling/adjusting the amount of ink/toner usage, also in response to print image quality criteria and printer colorant reduction criteria selected by the user; thereby reducing ink usage necessary overall, while also achieving an acceptable or satisfactory print image quality on the printable medium.

In some embodiments, printable mediums having enhanced print density characteristics may be used with the system (printer controller), method and printer controller software of the present invention to increase the reduction in printer colorant (e.g., ink) usage, but without significantly affecting print image quality compared to other printable mediums that do not provide such enhanced print density characteristics and thus cannot achieve such reduction in printer colorant (e.g., ink) usage without significantly affecting print image quality. Printable mediums in the form of paper sheets having enhanced print density characteristics which are useful in embodiments of the present invention are described in commonly assigned U.S. Pat. Appln. No. 2007/0087134 (Koenig et al.), published Apr. 19, 2007 (hereafter referred to as "Koenig et al."), the entire disclosure and contents of which is herein incorporated by reference. These paper sheets of Koenig et al. comprise a size containing-substrate formed from lignocellulosic fibers and having on at least one surface thereof a water-soluble divalent metal salt. In these paper sheets of Koenig et al., the sizing level of the substrate, as measured by the HST of the substrate, and the amount of divalent metal salts on the surface of the substrate impact the image dry time of the paper sheet. The enhanced image dry time of these sheets is determined by the amount of ink transferred from a printed to an unprinted portion of the paper sheet after rolling with a roller of fixed weight.

The Hercules Sizing Test Value ("HST") of the substrate and the amount of divalent salt may be selected such that the paper sheet has a percent ink transferred ("IT%") value equal to or less than about 60%, for example, an IT% value in the range of from 0 to about 50%, such as from 0% to about 40% (e.g., from 0 to about 30%). In addition to improved image dry time, these paper sheets may also exhibit good print quality. Print quality (PQ) may be measured by using two parameters: print density and edge acuity. Print density is measured using a reflectance densitometer (X-Rite, Macbeth, etc.) in units of optical density ("OD"). The method involves printing a solid block of color on the sheet, and measuring the optical density. There may be some variation in OD depending on the particular printer used and the print mode chosen, as well as the densitometer mode and color setting. The printer used herein is an HP Deskjet 6122, manufactured by Hewlett-Packard, which uses a #45 (HP product number 51645A) black ink jet cartridge. The print mode may be determined by the type of paper and the print quality selected. For the data referred to herein, the default setting of Plain Paper type and Fast Normal print quality print mode may be selected. The densitometer used is an X-Rite model 528 spectrodensitometer with a 6 mm aperture. The density measurement settings are Visual color, status T, and absolute density mode. An increase in print density may be seen when sufficient amounts of divalent water-soluble metal salts are on the paper surface. In general, the target optical density for pigment black ("$OD_o$") is equal to or greater than 1.30 in the standard (plain paper, normal) print mode for the HP desktop ink jet printers that use the most common black pigment ink (equivalent to the #45 ink jet cartridge). For example, the $OD_o$ may be equal to or greater than about 1.40, such as an $OD_o$ equal to or greater than about 1.50. (e.g., an $OD_o$ equal to or greater than about 1.60).

The other parameter determining good print quality, edge acuity ("EA"), may be measured by an instrument such as the QEA Personal Image Analysis System (Quality Engineering Associates, Burlington, Mass.), the QEA ScannerIAS, or the ImageXpert KDY camera-based system. All of these instruments collect a magnified digital image of the sample and calculate an edge acuity value by image analysis. This value may also be called edge raggedness, and is defined in ISO method 13660. This method involves printing a solid line 1.27 millimeters or more in length, sampling at a resolution of at least 600 dpi. The instrument calculates the location of the edge based on the darkness of each pixel near the line edges. The edge threshold is defined as the point of 60% transition from the substrate reflectance factor (light area, $R_{max}$) to the image reflectance factor (dark area, $R_{max}$) using the equation $R_{60} = R_{max} - 60\% (R_{max} - R_{min})$. The edge raggedness may then be defined as the standard deviation of the residuals from a line fitted to the edge threshold of the line, calculated perpendicular to the fitted line. The value of edge acuity may be less than about 15, for example, an EA is less than about 12, such as less than about 10 (e.g., an EA is less than about 8).

The Hercules Sizing Test ("HST") value of the substrate for these paper sheets may be selected to provide the desired dry time characteristics. The HST of the substrate may be adjusted by the addition of a sizing agent to the printable medium. The desired HST may be obtained by internally sizing the substrate; that is, by adding sizing agents to the pulp suspension before it is converted to a paper web or substrate. Internal sizing helps prevent the surface size from soaking into the paper sheet, thus allowing it to remain on the surface where it has maximum effectiveness. The internal sizing agents for use herein may encompass any of those commonly used at the wet end of a paper machine. These internal sizing agents may include rosin sizes, ketene dimers and multimers, alkenylsuccinic anhydrides, etc.

The internal sizing may be used at levels of from 0 to about 1.0 wt. % (based on the weight of the dry paper sheet). For example, the internal size may be used at levels in the range of about 0.01 to about 0.5 wt. %, such as at levels of from about 0.025 to about 0.25 wt. %. Methods and materials which may be utilized for internal sizing with rosin are discussed, for example, by E. Strazdins in The Sizing of Paper, Second Edition, edited by W. F. Reynolds, TAPPI Press, 1989, pages 1-33, the entire disclosure and contents of which is herein incorporated by reference. Suitable ketene dimers for internal sizing are disclosed in, for example, U.S. Pat. No. 4,279,794 (Dumas), issued Jul. 21, 1981, in United Kingdom Pat. Nos. 786,543; 903,416; 1,373,788 and 1,533,434, and in European Patent Application Publication No. 0666368 A3, the entire disclosure and contents of which are herein incorporated by reference. Suitable ketene dimers are also commercially available, such as Aquapel® and Precis® sizing agents from Hercules Incorporated, Wilmington, Del. Ketene multimers for use in internal sizes are described in, for example, European Patent Application Publication No. 0629741A1, corresponding to U.S. patent application Ser. No. 08/254,813, filed Jun. 6, 1994;European Patent Application Publication No. 0666368A3, corresponding to U.S. Pat. No. 5,685,815 (Bottorff et al.), issued Nov. 11, 1997; and U.S. Pat. No. 5,846,863, issued Dec. 8, 1998, the entire disclosure and contents of which are herein incorporated by reference. Alkenyl succinic anhydrides for internal sizing are disclosed in, for example, U.S. Pat. No. 4,040,900 (Mazzarella et al.), issued Aug. 9, 1977, and by C. E. Farley and R. B. Wasser in The Sizing of Paper, Second Edition, edited by W. F. Reynolds, TAPPI Press, 1989, pages 51-62, the entire disclosure and contents of which are herein incorporated by reference. A variety of suitable alkenylsuccinic anhydrides are also commercially available from, for example, Albemarle Corporation, Baton Rouge, La.

The substrates having an enhanced image dry time may contain an "effective amount" of the divalent water-soluble metal salt which may be in contact with at least one surface of the substrate. As used herein, an "effective amount" with reference to the divalent water-soluble met salt refers to an amount which is sufficient to enhance the dry time of the substrate to any extent. This total amount of divalent water-soluble metal salt in or on the substrate may vary widely, provided that the desired enhancement of the dry time is achieved. This amount may be at least and 0.02 g/m² although lower or higher amounts may be used. For example, the amount of divalent water-soluble metal salt may be in the range of from about 0.1 to about 3 g/m² (e.g., from about 0.2 to about 2.0 g/m²). In some embodiments of choice, the amount of divalent water-soluble metal salt may be in the range of from about 0.4 to about 1.5 g/m².

In some embodiments of the paper sheets having enhanced dry times, a mixture comprising calcium chloride and one or more starches may be in contact with at least one surface of the substrate. Illustrative of such starches are naturally occurring carbohydrates synthesized in corn, tapioca, potato and other plants by polymerization of dextrose units, etc. All such starches and modified forms thereof such as starch acetates, starch esters, starch ethers, starch phosphates, starch xanthates, anionic starches, cationic starches, oxidized starches, etc., may be derived by reacting the starch with a suitable chemical or enzymatic reagent. Useful starches may be prepared by known techniques or may be obtained from commercial sources. For example, the suitable starches may include Ethylex 2035 from A. E. Staley, PG-280 from Penford Products, oxidized corn starches from ADM, Cargill, and Raisio, and enzyme converted starches such as Amyzet 150 from Amylum. The modified starches may include cationic modified chemically modified starches such as ethylated starches, oxidized starches, and AP and enzyme converted Pearl starches.

When calcium chloride (as the divalent water-soluble metal salt) and Ethylex 2035 starch (as the internal sizing) are used, the desired dry time of the paper sheet may be obtained when the weight ratio of the calcium chloride to the starch is equal to or greater than from about 5%, up to about 200%. In these embodiments, the weight ratio of the calcium chloride to the starch may be in the range of from about 5 to about 100%, for example, from about 7% to about 70%, such as from about 10% to about 40%. In these embodiments of the paper sheet having enhanced dry times, the amount of the mixture of divalent water-soluble metal salt and one or more starches on the surface of a substrate may be at least about 0.02 g/m² of printable medium, although higher and lower amounts may be used. The amount of this mixture may be at least about 0.05 g/m², for example, at least about 1.0 g/m², such as in the range of from about 1.0 to about 4.0 g/m².

Figure 1:
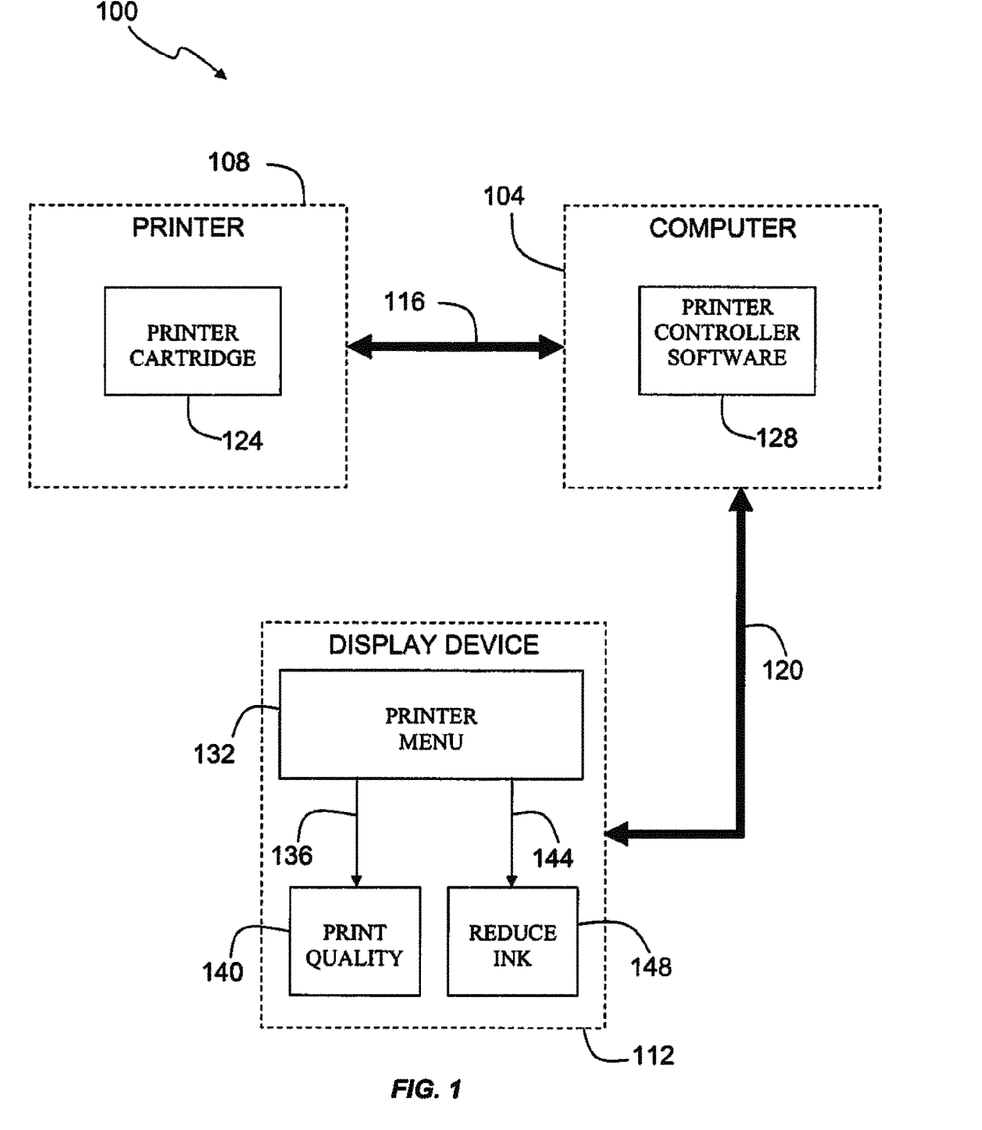
FIG. 1 is a schematic diagram which shows an illustrative system according to an embodiment of the present invention.
Figure 2:
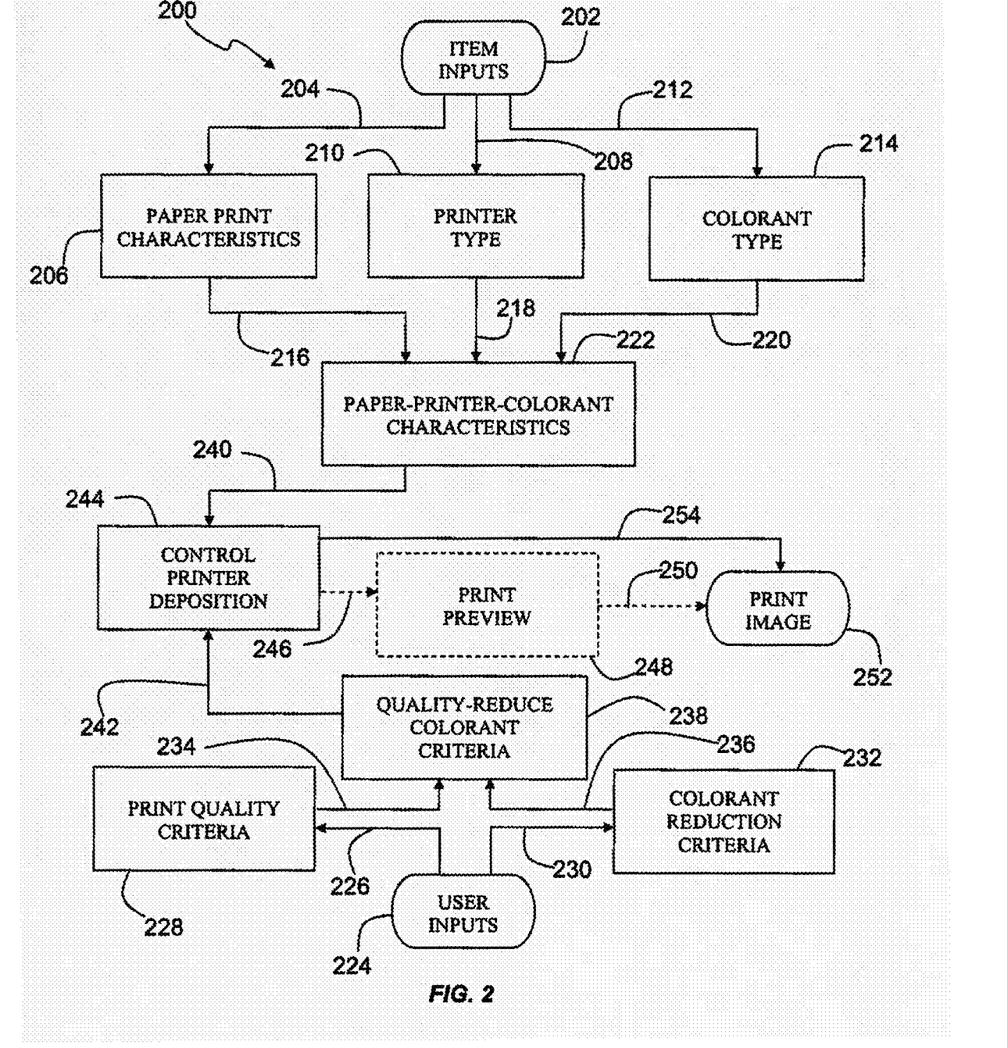
FIG. 2 is a flowchart which shows an illustrative method according to an embodiment of the present invention.

Embodiments the method of the present invention are further illustrated in FIGS. 1 and 2. FIG. 1 is a schematic diagram which shows an illustrative system according to an embodiment of the present invention, which is generally indicated as 100. As shown in FIG. 1, system 100 may comprise a computer 104, a printer 108, and a display device (e.g., monitor) 112. As indicated by double-headed arrow 116, computer 104 and 108 are in electronic communication with each other. As indicated by double-headed arrow 120, computer 104 and display 112 are in electronic communication with each other. Printer 108 has associated therewith (e.g., loaded thereon) a printer cartridge 124 which contains printer colorant (e.g., ink or toner). Computer 104 has associated therewith (e.g., loaded thereon) printer controller software 128. Display 112 provides for viewing a printer menu (e.g., dialog box) 132. As indicated by arrow 136, printer menu 132 provides for the selection of the desired printer image quality (referred to in FIG. 1 as Print Quality 140). As indicated by arrow 144, printer menu 132 also provides for the selection of the desired reduction in printer colorant usage (referred to in FIG. 1 as Reduce Ink 148).

The identifying printer characteristics data of printer 108 may be received by computer 104 from printer 108 in the form of signals indicating the printer type, printer model, printer maker, printing characteristics, etc. These identifying printer characteristics data of printer 108 may be obtained by printer controller software 128 directly from printer 108, and thus used to provide operating instructions to computer 104 and printer 108 to control the deposition of printer colorant from printer cartridge 124. The identifying printer colorant characteristics data of the printer colorant may be obtained by printer controller software 128 directly from printer cartridge 124, and thus also used to provide operating instructions to computer 104 and printer 108 to control the deposition of printer colorant from printer cartridge 124

Printer controller software 128 may be installed or pre-loaded onto computer 104 in a variety of ways. For example, printer controller software 128 may be provided on a machine-readable medium which is provided separately from computer 104 or printer 108, may be provided with computer 104, may be provided with printer 108, may be provided with the printable medium (e.g., e.g., provided with one or more reams of paper) to be used with printer 108, etc. Alternatively, the printer controller software 128 may be remotely downloaded to computer 108 (or a machine-readable medium) from, for example, a web site, server, etc., via the Internet, via a LAN (or WAN), or via any other way for remotely downloading software. For example, a product key may be provided with printer 108, or with the printable medium (e.g., printed on the packaging for the ream(s) of paper) to be used with printer 108, for remotely downloading printer controller software 128 to computer 108 (or a machine-readable medium).

FIG. 2 is a flowchart which shows an illustrative method according to an embodiment of the present invention, which is indicated generally as 200. In method 200, the relevant printable medium, printer, and printer colorant characteristics may be determined and are collectively referred to in FIG. 2 as the Item Inputs in step 202. In determining the Item Inputs in step 202, and as indicated by arrow 204, the identifying printer colorant deposition characteristics of the printable medium (referred to in FIG. 2 as the Paper Print Characteristics in step 206) may be determined In one embodiment, the identifying printer colorant deposition characteristics of the printable medium in step 206 may be determined by knowing what the printable medium being used. For example, the printable medium bar code from the packaging may be scanned into system 100, or the alphanumeric code from the packaging may be entered manually (or pre-loaded) into system 100. In another embodiment, the chemical properties (e.g., the amount of metal salt drying agent such as calcium chloride) of the printable medium may be analyzed by system 100 to determine the identifying printer colorant deposition characteristics of the printable medium/

As indicated by arrow 206, the identifying printer characteristics (referred to in FIG. 2 as the Printer Type in step 210) of the printer may also be determined (e.g. from printer 108 of FIG. 1). In one embodiment, printer characteristics in step 210 may be determined by knowing what the printer model is. For example, the printer model may be automatically verified by system 100 (e.g., by the computer 104 and/or printer controller software 128) or may be manually entered into system 100. As indicated by arrow 212, the identifying printer colorant characteristics (referred to in FIG. 2 as the Colorant Type in step 214) may also be determined (e.g., from printer cartridge 124 of FIG. 1). In one embodiment, the printer colorant characteristics in step 210 may be determined by knowing the type or number of the printer cartridge being used. For example, the printer colorant characteristics may be automatically verified by system 100 (e.g., by transmissions 116 sent by printer cartridge 124 to computer 104 and/or printer controller software 128) or may be manually entered (or pre-loaded) into system 100. As indicated by arrows 216, 218, and 220, the resulting determined characteristics from steps 206, 210 and 214 are collectively referred to in FIG. 2 as the Paper-Printer-Colorant Characteristics in step 222.

As also shown in FIG. 2, in method 200, the relevant print image quality criteria and printer colorant reduction criteria may be selected (e.g., from printer menu 132 provided by display 112 of FIG. 1) and are collectively referred to in FIG. 2 as the User Inputs in step 224. In selecting the User Inputs in step 224, and as indicated by arrow 226, the print image quality criteria (referred to in FIG. 2 as the Print Quality Criteria in step 228) may be selected by the user. The print image quality criteria in step 228 may be provided as one or more preset choices, may be provided, for example, as one or more slider bars, fill-in boxes, etc., to enable the user to adjust the selection of print image quality as a customized choice, etc. As indicated by arrow 230, the printer colorant reduction criteria (referred to in FIG. 2 as the Colorant Reduction Criteria in step 232) may also be selected by the user. In some embodiments, the print image quality criteria in step 228 may be selected by the user to be the same for all colors, differently depending upon the color printing involved (e.g., black and white printing versus color printing), etc. Like the print image quality criteria in step 228, the printer colorant reduction criteria in step 232 be provided as one or more preset choices, may be provided, for example, as one or more slider bars, fill-in boxes, etc., to enable the user to adjust the selection of the printer colorant (e.g., ink) usage reduction as a customized choice, etc. In some embodiments, the printer colorant reduction criteria in step 232 may be selected by the user to be the same for all colors, to be different depending upon the color printing involved (e.g., black and white printing versus color printing), to be different depending upon which color is being printed (e.g., usage reduction of black is different from usage reduction for other colors printed, usage reduction of each color is different, usage reduction is the same for two or more colors but different for other colors, etc.), etc. As indicated by arrows 234 and 236, the resulting criteria selected in steps 228 and 232 are collectively referred to in FIG. 2 as the Quality-Reduce Colorant Criteria in step 238.

As indicated by respective arrows 240 and 242 in FIG. 2, the Paper-Printer-Colorant Characteristics from step 222 and the Quality-Reduce Colorant Criteria from step 238 are transmitted to computer 104 of FIG. 1. In response to these transmissions 240 and 242, the printer controller software 128 may control (e.g., adjust) the deposition by printer 108 of printer colorant from printer cartridge 124 onto the printable medium, referred to in FIG. 2 as the Control Printer Deposition in step 244. In one embodiment of method 200, after the Control Printer Deposition in step 244, a request may be made by the user, as indicated by arrow 246, to provide for a preview of the projected print image (e.g., on display 112) which is referred to in FIG. 2 as the Print Preview in step 248. If after the Print Preview in step 248, it is determined by the user that the projected print image is satisfactory, an instruction, as indicated by arrow 250 may be transmitted to computer 104 (and thereafter to printer 108) to print the image (referred to in FIG. 2 as Print Image in step 252). Alternatively, in method 200, the Print Preview in step 248 may be skipped, and the user may transmit an instruction, indicated by arrow 254, to carry out the Print Image in step 252.

System 100, as well as method 200, enable the user to achieve reductions in total usage of the printer colorant (e.g., ink and/or toner) by or to any desired level or amount, while also achieving acceptable print image quality. For example, system 100, as well as method 200, may enable the user to achieve reductions in total usage of the printer colorant of up to about 50%, for example, from about 10 to about 25%. In one embodiment, once the user has selected the Quality-Reduce Colorant Criteria in step 238, pigment colorant usage reduction according to step 244 (Control Printer Deposition) may be implemented by, for example, the method (e.g., HLS model) described with particular reference to paragraphs [0068] through 0094] of U.S. Pat. Appln. No. 2005/0063749 (Harris et al.), published Mar. 24, 2005, the entire disclosure and contents of which is herein incorporated by reference. This method operates generally by reducing the number of printed dots (e.g., when carrying out ink jet printing) within a given space (e.g., a rectangle), and is repeated over the print area of the projected image. The particular pattern of printed dot reduction is determined by previewing, for example, the bitmap of pixels of the projected image, and from that bitmap, then determining the pattern printed dots to be reduced within each give space which does not perceptibly alter the print image. In one embodiment of this method, the printer colorant usage reduction may be separated and controlled (e.g., adjusted) differently by identifying, from the bitmap of the projected image the black color pixels versus the pixels having colors other than black (e.g., white, cyan, magenta, yellow, etc.), After the black pixels versus pixels having colors other than black is identified, printer controller software 128 may then apply separate and different usage reduction levels/amounts in printing dots involving black pixels, versus printing dotes for pixels having colors other than black.

Dry Time Test Methodology

The dry time for a fast dry coated ink jet paper is measured as follows: The ink dry time is measured by the amount of ink transferred from a printed to an unprinted sheet after rolling with a roller of fixed weight. The test method involves printing solid blocks on test paper sample, waiting for 3 seconds of printing, cover the printed blocks with unprinted paper, and rolling with a 4.5 lb hand roller. The hand roller used in the test was obtained from Chem Instruments, Inc., Mentor, Ohio. The "ink transfer" is defined as the amount of optical density transferred to the unprinted sheet after rolling with a roller. The optical density is read on the transferred ($OD_t$), the non transferred ($OD_0$), and an un-imaged area ($OD_b$) by a reflectance densitometer from X-Rite. The percentage of ink transferred (IT%) is defined as IT% =$[(OD_t-OD_b)/(OD_0-OD_b)]*100$. The lower the percentage of ink transferred, the better the ink dry time.

Show-Through Test Methodology 1.0 Equipment—Densitometer (X-rite 518)

2.0 Procedure

Print a black box that is 150 mm by 450 mm using the HP Deskjet 6122 printer. Prints are made using the plain paper mode and varying the print quality settings (draft, fast normal, normal, best). Using the densitometer, measure density of the printed area, back of print, blank area, and covered print. Measure 3 times per area per sheet.

EXAMPLE

Figure 3:
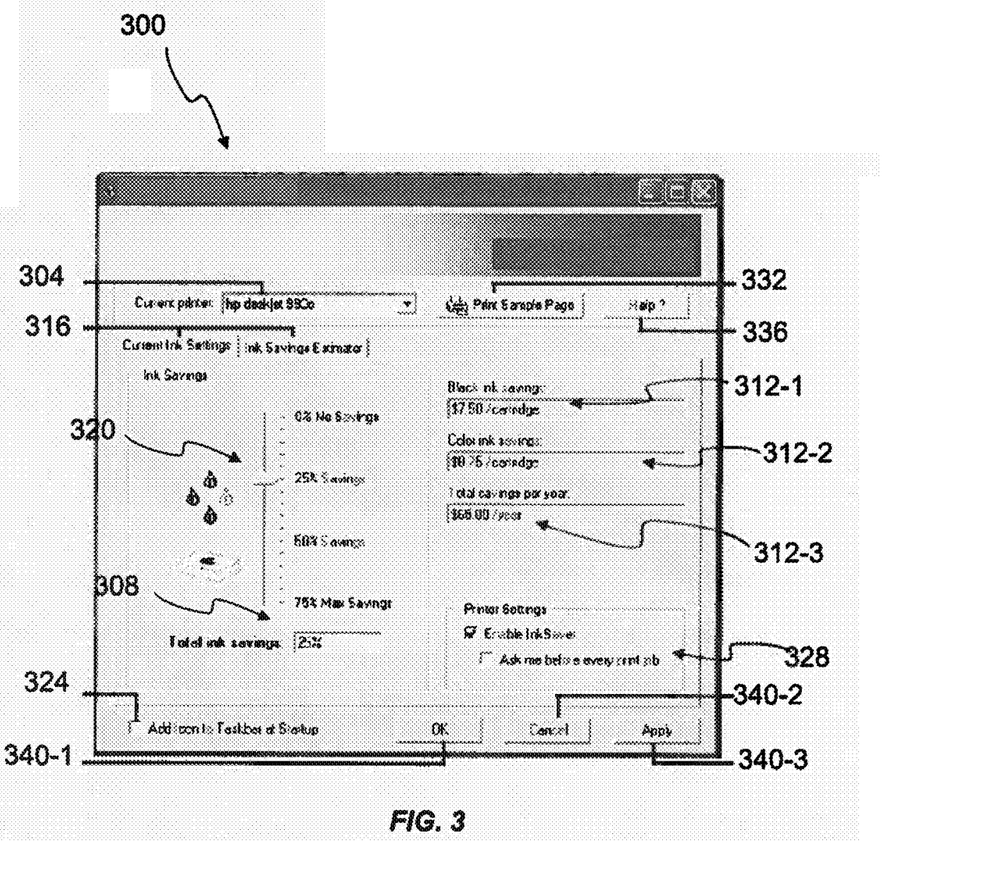
FIG. 3 is a screen capture of an illustrative printer menu dialog box provided by printer controller software according to one embodiment of the present invention
Figure 4:
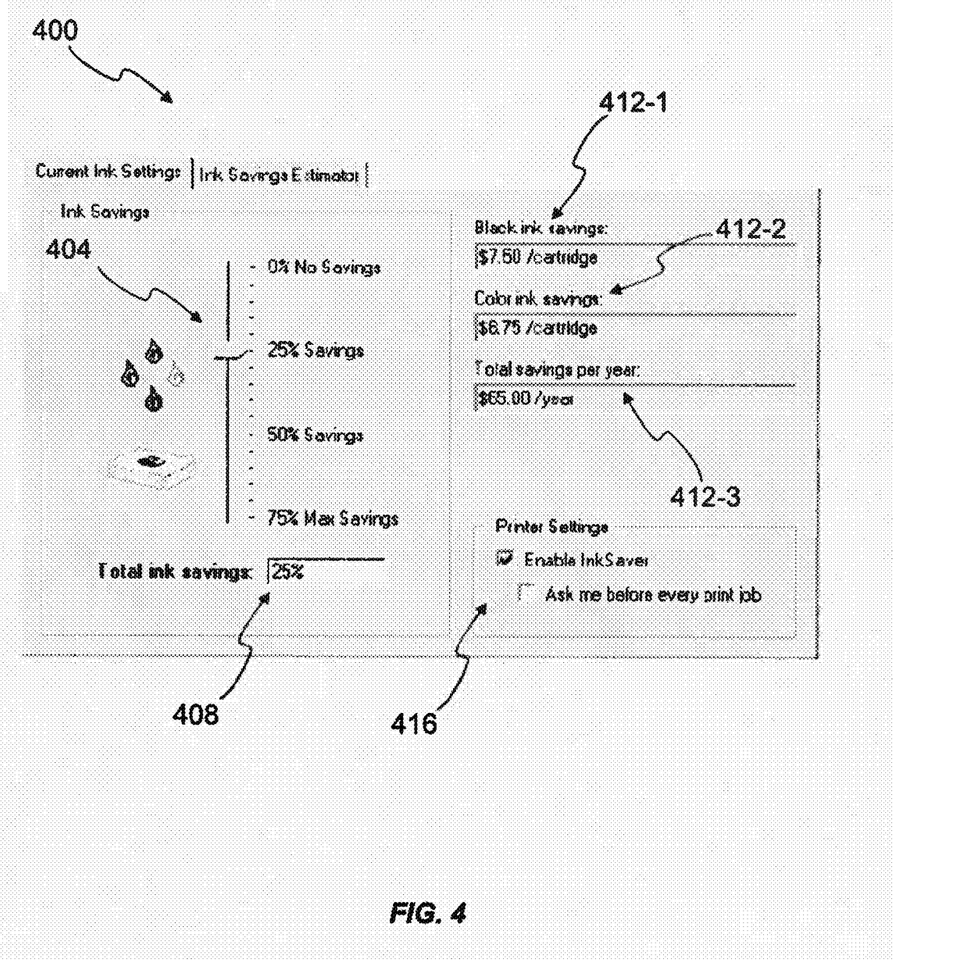
FIG. 4 is a screen capture of an illustrative ink setting tab from the dialog box of FIG. 3.
Figure 5:
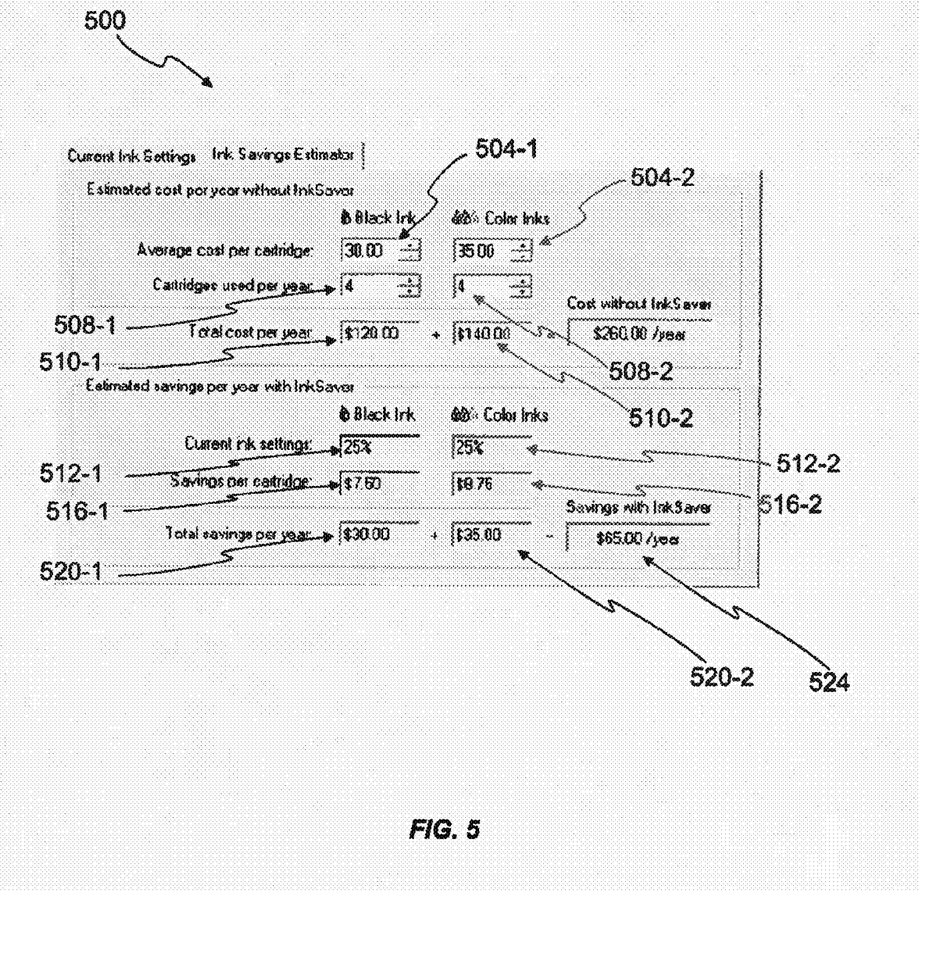
FIG. 5 is a screen capture of an illustrative ink savings estimator tab from the dialog box of FIG. 3.

FIGS. 3 through 5 are screen captures illustrating a printer menu dialog box, and associated tabs, for an ink jet printer according to one embodiment of the printer controller software of the present invention. Referring to FIG. 3, the dialog box, indicated generally as 300, may display a number of items of information. For example, as shown in FIG. 3, dialog box 300 displays in box 304 the current printer selected, in box 308 the current ink savings (reduction level/amount) provided, including the specific savings for black ink, color ink, total savings per month/year, as indicated by boxes 308-1, 308-2, and 308-3, respectively. As also shown in FIG. 3, dialog box 300 various options to select, such as the ability to select tabs 316, an adjustable slider bar 320 for changing the black ink and/or color ink savings, the ability to add icons to the taskbar, indicated as by 324, the ability to enable (or disable) the ink savings, as indicated by 328, the ability to print a sample page, as indicated by 332, a "Help ?" button 336, and buttons indicated, respectively, as 340-1, 340-2, and 340-3 to save, cancel, or apply the particular changes to the settings selected.

FIG. 4 illustrates an embodiment of a current ink setting tab for dialog box 300, indicated generally as 400. As shown in FIG. 4, tab 400 is provided with an ink saving slider bar 404 which provides for adjusting the ink reduction levels/amount by the printer according to, for example, a graduated scale which shows four settings identified as 0% (No) Savings, 25% Savings, 50% Savings and 75% (Max). As shown in the box indicated as 408, the current ink savings is set by slider bar 404 at 25%. Slider bar 404 may be manually adjusted to provide the desired level of ink savings or may be automatically adjusted in response to the particular printer and/or printer cartridge being used. The particular black ink savings, color ink savings, and total ink savings per year is indicated, respectively, by 412-1, 412-2, and 412-3. Tab 400 also shows that the printer settings has been checked to enable such ink savings, as indicated by 416.

FIG. 5 illustrates an embodiment of an ink savings estimator tab for dialog box 300, indicated generally as 500. As shown in FIG. 5, tab 500 is provided with two boxes, indicated as 504-1 and 504-2, to enter information, respectively, on the average cost per cartridge for black ink, and color inks Also provide are with two boxes, indicated as 508-1 and 508-2, enter, respectively, the estimated number of black and color cartridges that may be used per year. Based on the information entered into boxes 504-1, 504-2, 508-1, and 508-2, and along with the current ink settings set in tab 400, as indicated by 512-1 and 512-2, tab 500 may provide estimates on the total cost per year for the black ink and color cartridges, as indicated, respectively by 510-1 and 510-2. Tab 504 may also provide information on the estimated savings per cartridge, as indicated by 516-1 and 516-2, total savings per year for each of the black ink and color ink, as indicated, respectively, by 520-1 and 520-2, as well as the total savings provided per year, as indicated by 524.

It should be appreciated that the embodiments illustrated in FIGS. 1 through 5 are provided to illustrate the teachings of the present invention. Alterations or modification within the skill of the art of the embodiments in FIGS. 1 through 5 are considered within the scope of the present invention, so long as these alterations or modifications operate in a same or similar manner, function, etc.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A printing system comprising a printer having identifying printer characteristics data, a source of printer colorant associated with the printer and having identifying printer colorant characteristics data, a computer in electronic communication with the printer and which receives the identifying printer characteristics data and the identifying printer colorant characteristics data, a display device in electronic communication with the computer which displays a printer menu which comprises at least: (a) print image quality criteria to be selected; and (b) printer colorant reduction criteria to be selected, a printer controller associated with the computer, wherein the printer controller controls deposition by the printer of the printer colorant from the printer colorant source on a printable medium having identifying printer colorant deposition characteristics data to thereby reduce printer colorant usage in response to: (1) the identifying printer characteristics data received by the computer; (2) the identifying printer colorant characteristics data received by the computer; (3) the print image quality criteria selected; (4) the printer colorant reduction criteria selected; and (5) the identifying printer colorant deposition characteristics data.

2. The print system of claim 1, wherein the printer controller comprises software.

3. The print system of claim 1, wherein the printer controller also functions as a print driver for the printer.

4. The print system of claim 1, wherein the deposition by the printer of the printer colorant is controlled by adjusting the deposition in response to the identifying printer characteristics data (1) and the identifying printer colorant characteristics data (2) received by the computer, the print image quality criteria (3) and the printer colorant reduction criteria (4) selected, and the identifying printer colorant deposition characteristics data (5).

5. The print system of claim 1, wherein the identifying printer colorant deposition characteristics data (5) comprises one or more of dry time and print density.

6. The print system of claim 5, wherein the printable medium comprises a paper web and wherein the identifying printer colorant deposition characteristics data (5) comprises a dry time defined by the paper web having a percent ink transferred value equal to or less than about 60%.

7. The print system of claim 6, wherein the dry time is defined by the paper web having a percent ink transferred value of from 0 to about 30%.

8. The print system of claim 1, wherein the identifying printer characteristics data (1) comprises one or more of printer type, printer model, printer maker, and printing characteristics.

9. The print system of claim 1, wherein the identifying printer characteristics data (1) is obtained directly from the printer.

10. The print system of claim 1, wherein the identifying printer colorant characteristics data (2) comprises one or more of the color and the consistency of the printer colorant.

11. The print system of claim 1, wherein the printer colorant source comprises a printer cartridge and wherein the identifying printer colorant characteristics data (2) is obtained directly from the printer cartridge.

12. The print system of claim 11, wherein the printer cartridge is an ink jet printer cartridge and wherein the printer is an ink jet printer.

13. The print system of claim 11, wherein the printer cartridge is a toner cartridge and wherein the printer is a laser printer.

14. The print system of claim 1, wherein the printer menu provides for selecting one or both of the print image quality criteria (3) and the printer colorant reduction criteria (4) from preset choices.

15. The print system of claim 1, wherein the printer menu provides for selecting one or both of the print image quality criteria (3) and the printer colorant reduction criteria (4) by using one or more slider bars.

16. The print system of claim 1, wherein the printer menu provides for selecting the printer colorant reduction criteria (4) such that different printer colorant reduction levels may be selected for each color.

17. The print system of claim 1, wherein the printer menu provides for selecting the printer colorant reduction criteria (4) such that printer colorant reduction levels may be selected for black which are different from colors other than black.

18. A method for use with a system which comprises a printer, a source of printer colorant associated with the printer, a computer in electronic communication with the printer, and a display device in electronic communication with the computer which displays a printer menu which comprises at least: (a) print image quality criteria to be selected; and (b) printer colorant reduction criteria to be selected, the method comprising the following steps: (1) selecting print image quality criteria and printer colorant reduction criteria from the printer menu; (2) determining the identifying printer characteristics of the printer, the identifying printer colorant characteristics, and the identifying printer colorant deposition characteristics of a printable medium on which the printer colorant is to be deposited; and (3) controlling deposition by the printer of the printer colorant from the printer cartridge on the printable medium to thereby reduce printer colorant usage in response to: (a) the printer image quality and printer colorant reduction criteria selected; and (b) the identifying printer characteristics, the identifying printer colorant characteristics, and the identifying printer colorant deposition characteristics determined.

19. The method of claim 18, wherein the deposition by the printer of the printer colorant is controlled during step (3) by adjusting deposition of the printer colorant in response to the criteria (a) selected and the identifying characteristics (b) determined.

20. The method of claim 18, wherein the identifying printer colorant deposition characteristics are determined during step (2) from one or more of dry time and print density.

21. The method of claim 20, wherein the printable medium comprises a paper web and wherein the identifying printer colorant deposition characteristics of the paper web is defined by a dry time, wherein the paper web has a dry time defined by having a percent ink transferred value equal to or less than about 60%.

22. The method of claim 21, wherein the dry time is defined by the paper web having a percent ink transferred value of from 0 to about 30%.

23. The method of claim 18, wherein the identifying printer colorant deposition characteristics are determined during step (2) by analyzing chemical properties of the printable medium.

24. The method of claim 18, wherein the identifying printer colorant deposition characteristics are determined during step (2) by scanning a bar code from packaging for the printable medium into the system or by entering an alphanumeric code from packaging for the printable medium into the system.

25. The method of claim 18, wherein the identifying printer colorant characteristics are determined during step (2) from one or more of the color and the consistency of the printer colorant.

26. The method of claim 18, wherein the printer colorant source comprises a printer cartridge and wherein the identifying printer colorant characteristics are determined during step (2) directly from the printer cartridge.

27. The method of claim 26, wherein the identifying printer colorant characteristics are determined during step (2) by the system verifying automatically what the printer cartridge is.

28. The method of claim 26, wherein the printer cartridge is an ink jet printer cartridge and wherein the printer is an ink jet printer.

29. The method of claim 26, wherein the printer cartridge is an ink jet printer cartridge and wherein the printer is an ink jet printer.

30. The method of claim 18, wherein the identifying printer characteristics are determined during step (2) by the system verifying automatically what model the printer is.

31. The method of claim 18, wherein the printer menu provides for selecting one or both of the criteria (a) during step (2) from preset choices.

32. The method of claim 18, wherein the printer menu provides for selecting one or both of the criteria (a) during step (2) by using one or more slider bars.

33. The method of claim 18, which comprises the following step (4) of: providing for review of a projected print image prior to depositing the printer colorant on the printable medium to thereby print an image.

34. The method of claim 18, which step (3) is carried out without providing for review of a projected print image prior to depositing the printer colorant on the printable medium to thereby print an image.

35. The method of claim 18, wherein the printer colorant reduction criteria may be selected during step (3) such that different printer colorant reduction levels may be selected for each color.

36. The printer controller of claim 18, wherein the printer colorant reduction criteria may be selected during step (3) such that printer colorant reduction levels for black are different from colors other than black.

37. A product comprising a non-transitory machine readable medium having associated therewith printer controller software which is loadable on a computer for controlling a printer having identifying printer characteristics data and which is associated with a source of printer colorant and having identifying printer colorant characteristics data, the computer also being in electronic communication with a display device which displays a printer menu which comprises at least: (a) print image quality criteria to be selected; and (b) printer colorant reduction criteria to be selected, wherein the printer controller software controls deposition by the printer of the printer colorant from the printer colorant source on a printable medium having identifying printer colorant deposition characteristics data to thereby reduce printer colorant usage in response to: (1) the identifying printer characteristics data; (2) the identifying printer colorant characteristics data; (3) the print image quality criteria selected; (4) the printer colorant reduction criteria selected; and (5) the identifying printer colorant deposition characteristics data.

38. The product of claim 37, wherein the printer controller software also functions as a print driver for the printer.

39. The product of claim 37, wherein the printer controller software controls deposition by the printer of the printer colorant by adjusting the deposition in response to the identifying printer characteristics data (1) and the identifying printer colorant characteristics data (2) received by the computer, the print image quality criteria (3) and the printer colorant reduction criteria (4) selected, and the identifying printer colorant deposition characteristics data (5).

40. The product of claim 37, wherein the printer controller software responds to identifying printer colorant deposition characteristics data (5) comprising one or more of dry time and print density.

41. The product of claim 37, wherein the printer controller software responds to the identifying printer characteristics data (1) comprising one or more of printer type, printer model, printer maker, and printing characteristics.

42. The product of claim 37, wherein the printer controller software responds to the identifying printer characteristics data (1) is obtained directly from the printer.

43. The product of claim 37, wherein the printer controller software responds to the identifying printer colorant characteristics data (2) comprising one or more of the color and the consistency of the printer colorant.

44. The product of claim 37, wherein the printer colorant source comprises a printer cartridge and wherein the printer controller software responds to the identifying printer colorant characteristics data (2) obtained directly from the printer cartridge.

45. The product of claim 37, wherein the printer controller software responds to one or both of the print image quality criteria (3) and the printer colorant reduction criteria (4) being selected from a printer menu providing preset choices.

46. The product of claim 37, wherein the printer controller software responds to one or both of the print image quality criteria (3) and the printer colorant reduction criteria (4) being selected from a printer menu by using one or more slider bars.

47. The product of claim 37, wherein the printer controller software provides for the printer menu to select the printer colorant reduction criteria (4) such that different printer colorant reduction levels may be selected for each color.

48. The printer controller of claim 37, wherein the printer controller software provides for the printer menu to select the printer colorant reduction criteria (4) such that printer colorant reduction levels may be selected for black which are different from colors other than black.

49. The product of claim 37, wherein the printer controller software is preloaded onto a computer.

50. The product of claim 37, wherein the printer controller software is provided on a machine-readable medium.

51. The product of claim 37, wherein the printer controller software is provided with one or both of a computer and a printer with which the printer controller software is to be used.

52. The product of claim 37, wherein the printer controller software is provided with the printable medium.

53. The product of claim 52, wherein the printable medium comprises one or more reams of paper and wherein the printer controller software is provided with the one or more reams of paper.

54. The product of claim 52, wherein the printer controller software is provided by remotely downloading the printer controller software.

55. The product of claim 52, wherein the printer controller software is remotely downloaded by using a product key.

56. The product of claim 55, wherein the product key for the printer controller software is provided with one or more of a computer, a printer, a printable medium, or packaging for the printable medium.

57. The product of claim 54, wherein the printer controller software is remotely downloaded onto a computer.

58. The product of claim 54, wherein the printer controller software is remotely downloaded onto a machine-readable medium.

* * * * *